еPatented Oct. 1, 1946

2,408,690

UNITED STATES PATENT OFFICE 2,408,690

POLYMERIZATION OF VINYL AROMATIC COMPOUNDS

Raymond B. Seymour, Dayton, Ohio, assignor to Monsanto Chemical Company, a corporation of Delaware No Drawing. Application April 8, 1943, Serial No. 482,310

4 Claims. (Cl. 260—36)

This invention relates to a polymerization process and, more particularly, to a process of polymerizing monomeric vinyl aromatic compounds or mixtures of materials containing the same.

The polymerization of monomeric styrene in presence or absence of other polymerizable compounds or cross-linking agents in molds to form shaped articles such as rods, tubes, sheets variously formed objects, etc., is known. This invention relates to improvements in such processes and particularly in those casting processes wherein shrinkage is involved during the polymerization.

When a vinyl aromatic compound is polymerized in a mold, the resulting cast product often shows surface imperfections which I believe are probably due to non-uniform adhesion between the polymerizing material and the walls of the container. These imperfections are a function of the amount of shrinkage which takes place during conversion of the monomer to the final hard, solid polymer. The amount of shrinkage incurred is dependent, of course, upon the nature of the monomeric material as well as on the size of the castings, being greater for large castings than it is for small ones. Generally the amount of shrinkage increases with the complexity of the macromolecular structure of the polymer. For example, while styrene shrinks somewhat on polymerization to polystyrene, the amount of shrinkage is not nearly so great as that which occurs in the polymerization of a mixture of styrene and divinylbenzene to give a three-dimensional (cross-linked) copolymer. In the preparation of cross-linked copolymers, the amounts of shrinking which takes place generally increases with an increase in the amount of cross-linking agent which participates in the copolymerization.

Molds may be constructed of glass or various metals such as lead, lead alloys, or any metal or alloy which has no deleterious effect on polymerization. I have attempted to overcome the uneven adhesion of the polymerizing material to the walls of the mold by providing a super-clean surface, i. e., by scrupulously washing and drying the mold previous to pouring therein the monomeric, polymerizable material. Although I have tried various methods of removing all foreign material from the wall surface, I have not been able to obtain a surface which would result in a flawless product. Likewise, I have attempted to eliminate or at least mitigate such uneven adhesion by providing a thin film of a material such as Cellophane between the polymer and the surface of the mold, but this procedure also was ineffective in the production of flawless, shaped articles. The use of mold lubricants, for example, alkyl stearates and alkyl oleates, has also been investigated, but this method is also ineffective when abnormal shrinking takes place.

I have now found that uneven adhesion of polymerizing vinyl aromatic compounds or mixtures containing the same to the walls of the casting molds can be suppressed and even entirely eliminated by incorporating into the monomeric material or the partly polymerized material small amounts of surface-active agents which are soluble therein. The amount of agent to be added depends upon the ratio of the wetted surface area of the mold to the weight of monomeric material contained in the mold. The amount of surface-active material is of a small order, being generally less than 0.05% by weight of the monomeric material even for castings having a relatively large surface-volume ratio. Ordinarily, the amount of surface-active agent employed is a minor amount, say, about 0.05 gram per one square foot of the surface area of the casting. This may be varied however over the range of from 0.01 gram to 1.0 gram per square foot of surface.

Although the surface-active agents are actually mixed with and dissolved in the monomeric material, I believe that the molecules of the agents during polymerization orient themselves in the medium in such a manner that at the end of the polymerization they are found on the surface of the final polymer, the polar groups being attracted to the mold surface. Since the surface-active material is employed only in minute amounts, and since it is present substantially only on the surface of the solid polymer, the electrical properties of the polymeric materials are not thereby impaired.

The present invention is of particular importance in the production of sheets or other forms of hard, solid, resinous material where a large surface presents itself. The inclusion of a surface-active agent in the monomeric or partially polymerized materials prior to the final polymerizing step, is effective in the production of smooth, unpitted sheets of the polymer which are free of the crevices and other imperfections that are associated with the casting of large pieces of such resins in the absence of surface-active agents. The invention is also of the utmost importance in the casting of irregularly shaped articles, since in these objects even minor surface imperfections tend to distort the shape of the product.

Incorporation of the surface-active agent may be effected by dissolving it either into the monomer or mixture of monomers either prior to the polymerizing step or at any stage of the polymerization while the polymerizing material is still in a substantially liquid state. As surface-active agents I may employ any of the known oil-soluble synthetic wetting agents such as Duponol O. S. which is reputed to be a mixture of soduim oleyl sulfate and oleyl alcohol; Santomerse 43-P, which is the butylamine salt of dodecylbenzenephosphinic acid; Santomerse CHS, which is the cyclohexylamine salt of dodecylbenzenesulfonic acid; Santomerse 43, which is the butylamine salt of dodecylbenzenesulfonic acid; Aerosol OT, which is the dioctyl ester of sodium sulfosuccinic acid; Sapamine A, which is reputed to be diethyl aminoethyl oleyl amide acetate; the synthetic wetting agents of the Alox series which are reputed to be complex methyl esters of high molecular weight alcohols, acids and lactones, etc.

All of these surface-active agents have in common a polar group which imparts surface-active properties to the compound such as wetting, spreading and surface-tension lowering effects. These agents furthermore also have in common a solubilizing group, such as a long hydrocarbon chain, which renders the material soluble in oil and also in the monomeric vinyl aromatic compound.

As the vinyl aromatic hydrocarbon I may employ styrene; the nuclearly substituted styrenes like ortho-, meta- or para-ethyl styrene or the ortho-, meta- or para-chlorostyrene; the alpha-alkyl or alpha-halogen substituted styrenes such as alphamethylstyrene, alpha, para-dimethylstyrene or alpha-chlorostyrene; the vinyl substituted polynuclear hydrocarbons such as vinylnaphthalene, etc.

As stated above, the invention is of particular value in the preparation of cross-linked copolymers of vinyl compounds. Mixtures of the above mentioned monomeric vinyl compounds with cross-linking agents, i. e., compounds containing at least two olefinic double bonds, copolymerize in the presence of surface-active agents to give shaped articles that are entirely free of surface imperfections. As cross-linking agents may be employed such compounds as esters of dicarboxylic acids with unsaturated alcohols, for example, diallyl fumarate, diallyl succinate, diallyl phthalate or dicrotyl maleate; divinyl derivatives or aromatic hydrocarbons such as divinylbenzene or divinylnaphthalene; esters of dihydric alcohols with unsaturated acids such as ethylidene glycol dimaleate or dicrotonate; dialkylene ethers such a divinyl ether or diallyl ether; anhydrides of unsaturated acids such as methacrylic anhydride, etc.

The invention is further illustrated, but not limited, by the following examples:

Example 1

A mixture consisting of 90 grams of styrene, 10 grams of diallyl fumarate, 2 grams of benzoyl peroxide and approximately 2 drops of a wetting agent known to the trade as Duponol O. S. was heated in a glass mold for 2 days at a temperature of 50° C. and then for 1 day at a temperature of about 70° C. The resulting shaped article was a hard, water-clear object which separated readily from the mold and was entirely free of any surface flaws.

When the above mixture was polymerized under the same conditions as given above but in the absence of a wetting agent, the resulting copolymer had large surface indentations on two sides of the cast object due to improper adhesion of the polymerizing mixture to the mold, and the other two sides of the cast piece stuck to the mold in such a manner as to make very difficult the clean removal of the cast object from its mold.

The effect of Duponol O. S. in eliminating surface flaws from cast pieces of styrene-diallyl fumarate copolymer is also evident when the ratio of styrene to diallyl fumarate is materially changed. For example, copolymerization of a mixture of 95 grams of styrene and 5 grams of diallyl fumarate or a mixture of 98 grams of styrene and 2 grams of diallyl fumarate in the presence of the amounts of benzoyl peroxide and Duponol O. S. stated above also results in the production of hard, transparent and colorless cast resins which are free of surface flaws. On the other hand, polymerization of such styrene-diallyl fumarate mixtures in absence of the wetting agent leads to cast products that are characterized by creviced and pitted surfaces and are difficultly removable from the mold.

Example 2

A solution consisting of 10 parts of divinylbenzene, 20 parts of ethylvinylbenzene and 70 parts of diethylbenzene was refluxed with 1.5 parts of benzoyl peroxide. When the reaction mixture had become quite viscous, it was gradually poured, with agitation, into ethyl alcohol. A precipitate formed and was removed from the alcohol solution. The precipitate so formed consists of copolymerized divinylbenzene and ethylvinylbenzene. 10 parts of the resulting precipitate was then dissolved into 100 parts of styrene, approximately 0.05 part of a wetting agent known to the trade as Duponol O. S. was added to the mixture, and the whole was polymerized in a glass tube having a diameter of 0.5 inch for 40 hours at a temperature of 60° C. and then for 7 days at a temperature of 110° C. The resulting hard, clear, water-white resin is readily removed from the mold and presents a smooth, flawless surface. It requires no polishing or machining prior to application for purposes for which cast rods are customarily employed.

However, when 10 parts of the precipitated resin described above is copolymerized with 100 parts of styrene under the same polymerizing conditions and in the same kind of mold but in the absence of the wetting agent, the hard copolymer obtained had one-tenth inch indentations over approximately 25% of the surface. In order for this product to be used as a rod, it had to be turned on the lathe; 20% of the material was lost before a uniformly smooth surface was secured on the rod.

For some purposes it may be desirable to utilize only the divinylbenzene. In this case monomeric divinylbenzene is first polymerized with the aid of a polymerization catalyst, while dissolved in a solvent such as ethylbenzene, xylenebenzene or toluene. The solution of the polymer is then poured into alcohol, the resulting precipitate recovered, dried and then dissolved in the monomeric mono-vinyl compound.

Example 3

A mixture consisting of 10 parts of divinylbenzene, 90 parts of styrene and approximately 0.05 part of a wetting agent known to the trade as Duponol O. S. was polymerized in the glass tube described above for a time of 40 hours at a temperature of 60° C. and then for 7 days at a temperature of 110° C. The solid, transparent copolymer which was thus obtained was readily removed from the mold and presented no surface imperfections.

When the monomeric mixture of this example was polymerized under the conditions described above, but in the absence of a wetting agent, the hard copolymer was pitted with large crevices and stuck to the mold.

Instead of employing Duponol O. S. as the wetting agent in the above examples, I may likewise use equally small concentrations of other commercially available oil-soluble wetting agents such as the herein disclosed members of the series of wetting agents known to the trade as the Santomerse series, or the oil-soluble members of other series of wetting agents such as those known to the trade as the Aerosols, the Sapamines, etc. Also, the organic amine salts of higher fatty acids or naphthenic acids, which salts are usually oil-soluble and are known to possess surface-activity, may be employed for this purpose.

When styrene, together with divinylbenzene, is employed to produce a copolymer, the divinylbenzene may comprise from 0.5% up to 20% or 25% by weight of the copolymer. The divinylbenzene may be either the para-divinylbenzene or the meta-divinylbenzene, or mixtures of the two.

While the examples have been limited to the use of surface-active agents in the copolymerization of styrene with certain cross-linking agents, the invention is also applicable to the polymerization of a vinyl aromatic compound, alone. While serious pitting of the surface is not generally encountered in the casting of styrene, the use of surface-active agents with styrene in the casting of intricate pieces facilitates removal of the same from the mold and minimizes imperfections. The invention is likewise applicable to the production of cast copolymers of styrene with other polymerizable organic compounds, in presence or absence of a cross-linking agent.

Although this invention contemplates principally the casting of copolymers from a binary mixture of styrene and a cross-linking agent in presence of a surface-active agent, it also includes copolymers from ternary or polynary polymerizable mixtures comprising a vinyl aromatic compound, one or more additional polymerizable materials such as another vinyl aromatic compound, vinyl chloride, acrylonitrile, metacrylonitrile, methyl methacrylate, maleic anhydride, etc., in presence or absence of a cross-linking agent, i. e., a compound having two vinyl groups.

There may be effected a modification of the physical properties and general appearance and utility of the final shaped articles by incorporating into the monomer or monomeric mixture various additives such as coloring agents, fillers and plasticizers. Such materials may be added in any convenient manner, before or during the polymerization, depending upon the effect such materials may have on the polymerizing rate of the monomers or on the properties desired in the finished copolymers.

As will be apparent to those skilled in the art, the polymerizing conditions herein described may be greatly varied, depending upon the nature of the monomeric mixture, the presence or absence of organic oxygen yielding catalysts and the size of the mold employed, the salient feature of the present invention being the use of a wetting agent in small amounts as a constituent of polymerizable materials comprising a vinyl aromatic compound in the production of cast resins.

What I claim is:

1. The process of polymerizing a polymerizable vinyl aromatic compound, which comprises dissolving in said vinyl aromatic compound prior to complete polymerization a minor amount of sodium oleyl sulfate and oleyl alcohol and then polymerizing said solution in a mold to form a solid polymer.

2. In the process of polymerizing styrene the steps of dissolving in said styrene prior to complete polymerization a minor amount of a mixture of sodium oleyl sulfate and oleyl alcohol and then polymerizing said styrene in a mold to form solid polystyrene.

3. The process of polymerizing a mixture of styrene and divinylbenzene, which comprises dissolving in said mixture a minor amount of a mixture of sodium oleyl sulfate and oleyl alcohol, and then polymerizing said mixture in a mold to form a solid polymer.

4. The process of polymerizing a mixture of styrene and divinylbenzene wherein said mixture contains between 0.5% and 25% by weight of divinylbenzene, which comprises dissolving in said mixture an amount of a mixture of sodium oleyl sulfate and oleyl alcohol in a quantity equivalent to less than 0.05% by weight of said mixture of styrene and divinylbenzene and then polymerizing the resulting solution in a mold to form a solid polymer.

RAYMOND B. SEYMOUR.